United States Patent Office 3,654,254
Patented Apr. 4, 1972

3,654,254
POLYMERISATION PROCESS
Brian Ernest Job, Alexander Joseph Peter Pioli, and Till Medinger, Runcorn, England, assignors to Imperial Chemical Industries Limited, London, England
No Drawing. Filed Nov. 25, 1969, Ser. No. 879,905
Claims priority, application Great Britain, Dec. 16, 1968, 59,704/68
Int. Cl. C08f 3/04, 1/30
U.S. Cl. 260—94.9 B     6 Claims

ABSTRACT OF THE DISCLOSURE

Ethylene is polymerised by contact with an initiator of the general formula $M(all)_3X$ or $M(all)_2X_2$ where M is a transition metal of Group IV of the Periodic Table of Elements, (all) is a $\pi$-allylic group and X is a halogen atom.

---

This invention relates to the polymerisation of ethylene and, especially to the polymerisation of ethylene using $\pi$-allylic transition metal compounds as initiators.

It has been proposed to polymerise olefinically unsaturated monomers using $\pi$-allylic transition metal compounds as initiators. For example, ethylene has been polymerised both at high (1000 atmospheres and above) and low (1 to 50 atmospheres) pressures to give solid polymers, generally of the type commonly referred to as "high-density" polyethylene.

In particular, $\pi$-allyl compounds of Group IV transition metals in which four $\pi$-allyl ligands are attached to each metal atom have proved to be active initiators for ethylene polymerisation.

It was proposed in British Patent 1,058,680 to initiate ethylene polymerisation using tris($\pi$-allyl) chromium though this compound is not as active as, say, tetrakis($\pi$-allyl)zirconium. The polymerisation of ethylene using bis($\pi$-allyl) chromium iodide is also described, but its activity is considerably less than that of the tris($\pi$-allyl) chromium.

We have found that replacement of one $\pi$-allyl ligand in tetrakis($\pi$-allyl) compounds of Group IV transition metals by a halogen ligand has an opposite effect to that achieved in the case of chromium, i.e. a considerable enhancement of initiator activity occurs.

According to the present invention a process for the polymerisation of ethylene comprises contacting ethylene with an initiator of the general formula $$M(all)_3X \text{ or } M(all)_2X_2$$

where

M is a Group IV transition metal atom
(all) is a $\pi$-allyl group
X is a halogen atom.

Compounds of this type often occur in dimeric form.

By the term "$\pi$-allyl group" we mean an allylic group of the general formula:

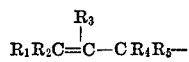

bonded to the metal.

In the formula $R_1$ to $R_5$, which may be the same or different, represent hydrogen atoms or monovalent substituents, such as hydrocarbyl group, for example, alkyl, aryl, aralkyl, alkaryl or alkenyl (where alkyl includes cycloalkyl) or a substituted derivative thereof. Alternatively, two or more of the free valencies satisfied by $R_1$ to $R_5$ may be linked together by a divalent organic radical, for example, a polymethylene or alkylidene group.

The preferred Group IV transition metal is zirconium, and the halogen atom is preferably chlorine, bromine or iodine.

Compounds according to the above general formula may be prepared by a number of techniques, some of which are described in the literature. For example, tetrakis($\pi$-allyl) zirconium may be reacted with one or two molar equivalents of hydrogen halide under anhydrous conditions, though yields obtained by this process are not high. In a much preferred process tetrakis($\pi$-allyl) zirconium is reacted with an organic halide. Sufficient organic halide should be used to provide one or two atoms of halogen per molecule of $\pi$-allyl compound, depending upon whether the mono or dihalide is required. The preferred organic halides are those in which the halogen is activated by the functional groups to which it is attached. Thus triphenylmethyl chloride or bromide and propargyl chloride or bromide are particularly active in this respect.

Precautions must be taken at all times during the preparation of the initiator and in its subsequent use, to avoid contact with air and moisture to prevent loss of catalytic activity. Many of the $\pi$-allylic compounds useful in our invention are preferably stored at temperatures below 0° C.

It has been found that under certain circumstances the purity of the solution of $\pi$-allylic compound used as initiator has a marked effect on its activity. To take advantage of this effect, the $\pi$-allylic compound may be purified by any suitable technique, for example, recrystallisation from a suitable solvent, such as pentane. Generally a single recrystallisation is sufficient. The use of ethers as solvents in the preparation and subsequent handling of the $\pi$-allylic compound has a deleterious effect on the activity of the initiator; these solvents are therefore preferably avoided.

The polymerisation of our invention may be carried out at any pressure above atmospheric. The process may be carried out either batchwise or continuously, the latter being conveniently performed under combined conditions of pressure and temperature such that the ethylene, and polyethylene exist as a single fluid phase using a $\pi$-allylic transition metal initiator at a pressure of not less than 1600 atmospheres and temperature not less than 125° C.

Such continuous polymerisation may be conducted in substantially the same way as the well known high pressure process for the polymerisation of ethylene in which free-radical producing compounds are used as initiators. In the conventional high pressure processes it is not normally necessary to carry out a purifying process to remove residual initiator from the product. Thus if organo-metallic initiators are to be used analogously, it is desirable to use an initiator of sufficiently high efficiency for its residues to be present in the product only in low concentrations which are not detrimental to the product for most normal uses. The transition metal $\pi$-allylic monohalide initiators of the present invention are thus of particular interest from this point of view.

In order to satisfy the above requirement the effective initiator efficiency is preferably such that the amount which must be added to the reactor is not more than 0.1% by weight of the polymer produced by the process, so that the metal residue from the initiator is present in a tolerable amount.

Our π-allyl halide initiators possess a particular advantage over the Ziegler catalysts when used in the high pressure polymerisation process in that, unlike most Ziegler catalysts they are soluble in a number of liquids inert to the polymerisation reaction, and can thus be more easily introduced at controlled rates into the polymerisation reaction.

The initiators used in the process of our invention may be used in the temperature range 0–300° C.; but the choice of temperature within that range will depend upon the conditions of polymerisation and the nature of the initiator used. For example, in a continuous polymerisation process when using tris(π-allyl) zirconium bromide, temperatures in the range 150–220° C. are preferred; but, as already mentioned, in such a process, the temperature is largely co-dependent on the pressure so as to ensure the desired operating conditions.

The initiator is dissolved in a suitable inert solvent such as white spirit, hydrocarbon oils, pentane, hexane, heptane, isooctane, toluene and decahydronaphthalene. The ethylene and any solvent used must be rigorously dried and freed from deleterious impurities. The initiator solution is kept out of contact with water and air preferably under a nitrogen blanket, before its introduction. The choice of concentration of initiator in the solution will depend on several factors, such as the activity of the initiator, and, in the continuous process, the pumping speed used to inject the solution into the reactor, the nozzle characteristics and the solvent used. The optimum concentration may be readily determined by simple experiment, but concentrations in the range 0.1 to 5% have been found suitable.

Chain transfer agents may be used in the reaction in accordance with normal practice, and will in fact usually be required. In the absence of chain transfer-agents, π-allyl initiators may give polymers of such high molecular weight and low melt flow index that they are difficult to handle. Hydrogen is a very suitable chain transfer agent to use in conjunction with these initiators.

Although the invention has been described with reference to the polymerisation of ethylene alone, we do not wish to exclude the possibility of co-polymerising other suitable monomers with the ethylene. Suitable co-monomers are those which do not react with the π-allyl initiator, thus monomers containing —OH or —$NH_2$ groups should be avoided.

The invention is further illustrated by but not limited to the following examples.

EXAMPLE 1

A 1 litre stainless steel autoclave was purged with high purity ethylene and charged with 450 ml. toluene. The vessel was heated to 160° C. and ethylene and hydrogen were introduced until partial pressures of 27 kg./cm. and 10 kg./cm., respectively, were attained. When the vessel was at temperature (about 160° C.) the partial pressure of the solvent was 3 kg./cm., giving a total gas 40 kg./cm. 1.5 millimoles of tris(π-allyl) zirconium bromide, dissolved in toluene was pumped in and polymerisation was allowed to continue for 10 minutes, after which the apparatus was cooled and vented. The polymer was then removed, washed with methanol, dried under vacuum at 80° C. and weighed (47 g.). The activity was 7.0 grams of polyethylene produced per millimole of initiator per kg./$cm^2$. ethylene pressure per hour.

By way of comparison the above procedure was repeated using 1.5 millimoles of tetrakis(π-allyl) zirconium. The polymerisation was allowed to proceed for an hour under otherwise identical conditions. The yield was 20 g. from which the activity may be calculated as 0.5 in the above units. It will be seen that the use of the mono halide derivative of the tetrakis(π-allyl) zirconium leads to considerably enhanced activity.

EXAMPLE 2

The procedure of Example 1 was repeated using 1.5 millimoles of tris(π-allyl) hafnium bromide. The polymerisation time was 15 minutes, and the yield was 30.5 g. polyethylene. The activity is calculated to be 3.0 in the same units.

EXAMPLE 3

The procedure of Example 1 was repeated using 1.5 millimoles of tris(π-2-methallyl) zirconium chloride previously prepared by the reaction of tetrakis (π-methallyl) zirconium with triphenylmethyl chloride.

After 1 hour polymerisation time the yield was 52.5 g. polyethylene. Activity: 1.3.

EXAMPLE 4

A stainless steel autoclave was purged with high purity ethylene and charged with 500 mls. toluene. The vessel was heated to 80° C. and 1.5 mM. of tris(π-allyl) zirconium chloride introduced via a syringe. The vessel was then resealed and ethylene and hydrogen introduced until the partial pressures of 10 kg./$cm.^2$ and 10 kg./$cm.^2$ respectively were attained. The polymerisation was allowed to continue for 1 hour, after which the apparatus was cooled and vented. The polymer was then removed, washed with methanol and dried under vacuum at 80° C. Weight: 45.6 g. The activity was 3.0.

EXAMPLE 5

The procedure of Example 4 was repeated using an equimolar amount of bis(π-allyl) zirconium dichloride. The yield of polyethylene was 30.5 g. giving an activity of 2.0.

EXAMPLE 6

The procedure of Example 4 was repeated using an equimolar amount of bis(π-allyl) zirconium dichloride. The yield of polyethylene was 60.6 g. Activity=4.0.

EXAMPLE 7

Dry ethylene was polymerised in a stirred continuous reactor using tris(π-allyl) zirconium chloride prepared from tetrakis(π-allyl) zirconium and triphenyl methyl chloride in equimolar amounts. The pressure was 2000 kg./$cm.^2$ and the temperature was 190° C. A 1% solution of the initiator in EC 180/cyclohexene was injected at a rate adjusted to maintain the reaction temperature at 180° C. Hydrogen was used as a molecular weight modifier.

2.4 gms. of initiator was required to produce 60 lbs. of polymer; that is, 10,300 moles of ethylene were polymerised per mole of initiator.

What we claim is:

1. A process for the polymerisation of ethylene which comprises contacting ethylene at a temperature of from 0° to 300° C. with an initiator having a general formula selected from the group consisting of M(all)$_3$X and M(all)$_2$X$_2$ where M is a transition metal selected from the group consisting of zirconium and hafnium, (all) is selected from the group consisting of π-allyl and π-methallyl and X is halogen selected from chlorine, bromine and iodine.

2. A process according to claim 1 in which the transition metal is zirconium.

3. A process according to claim 1, which is carried out at a pressure not less than 1600 atmospheres and at a temperature not less than 125° C.

4. A process according to claim 1 in which hydrogen is added as a chain transfer agent.

5. A process according to claim 1 wherein the initiator is tris(π-allyl) zirconium chloride or bromide dissolved in an inert hydrocarbon solvent, hydrogen is present as a chain transfer agent, the pressure is not less than 1600 atmospheres and the temperature is in the range 150°–220° C.

6. A process according to claim 1 wherein the temperature is not less than 80° C.

References Cited

UNITED STATES PATENTS

| | | | |
|---|---|---|---|
| 3,379,706 | 4/1968 | Wilke | 260—94.9 B X |
| 3,422,128 | 1/1969 | Wilke | 260—94.9 B UX |
| 3,424,777 | 1/1969 | Wilke | 260—94.9 B X |

FOREIGN PATENTS 932,231  7/1963  Great Britain ___ 260—94.9 B

JOSEPH L. SCHOFER, Primary Examiner
A. HOLLER, Assistant Examiner

U.S. Cl. X.R.

252—431 B

Disclaimer 3,654,254.—*Brian Ernest Job, Alexander Joseph Peter Pioli*, and *Till Medinger*, Runcorn, England. POLYMERISATION PROCESS. Patent dated Apr. 4, 1972. Disclaimer filed May 6, 1974, by the assignee, *Imperial Chemical Industries Limited*.

Hereby enters this disclaimer to claims 1–6, inclusive, of said patent.

[*Official Gazette August 27, 1974.*]